E. H. COTTRELL.
NEWSPAPER.
APPLICATION FILED APR. 1, 1913.

1,126,406.

Patented Jan. 26, 1915.

UNITED STATES PATENT OFFICE.

EDGAR H. COTTRELL, OF WESTERLY, RHODE ISLAND.

NEWSPAPER.

1,126,406.  Specification of Letters Patent.  Patented Jan. 26, 1915.

Application filed April 1, 1913. Serial No. 758,249.

*To all whom it may concern:*

Be it known that I, EDGAR H. COTTRELL, a citizen of the United States, and resident of Westerly, in the county of Washington and State of Rhode Island, have invented a new and useful Improvement in Newspapers, of which the following is a specification.

In newspapers and other large printed products of a similar character, as now folded parallel with the columns of printed matter, it is well known that because of the large size of the leaves and the poor quality of the paper, it is extremely difficult to properly hold the paper. Furthermore, when the newspaper of common use is unfolded, it is extremely difficult, awkward and tiresome to properly hold the same. It is also very difficult to fold back a leaf because of the tendency of the leaf to fall over by gravity in the wrong direction.

The object of my invention is to overcome these defects and disadvantages by providing a newspaper having its leaves secured together along a line transversely through the middle of the printed pages and provided with a fold along said line, so that the paper may be very easily held in a convenient position for reading and so that the leaves may be very readily folded over. Furthermore, the newspaper is kept at all times within a reasonable size for easy reading and handling.

A practical embodiment of my invention is represented in the accompanying drawings, in which—

Figure 1:
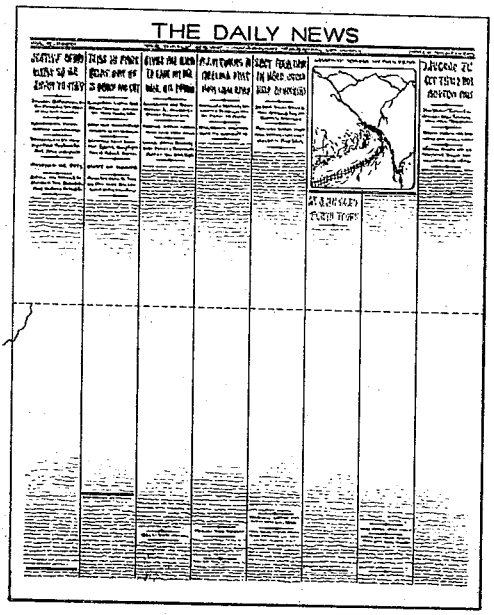
Figure 2:
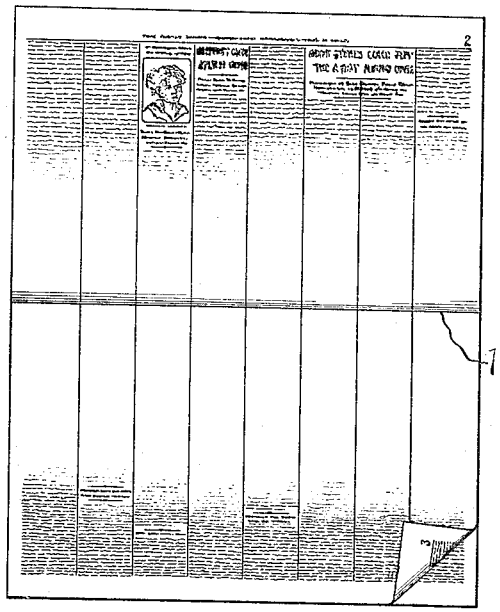
Figure 3:
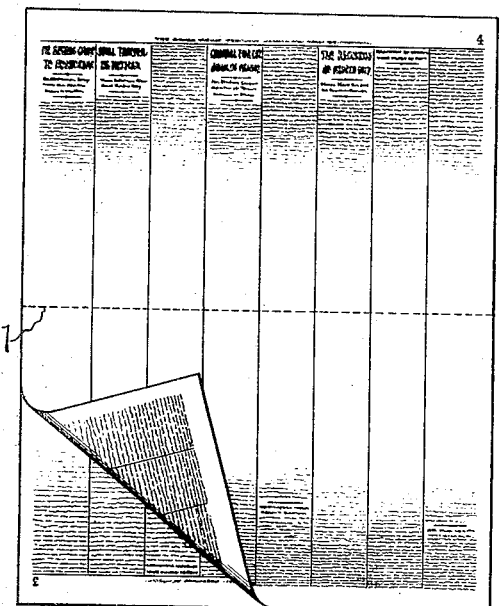
Figure 4:
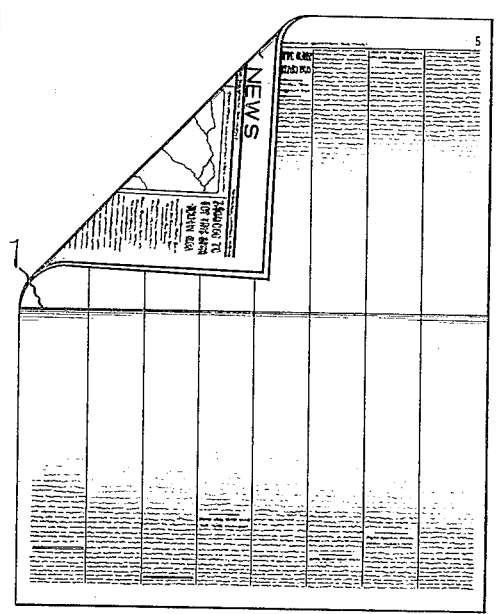

Figure 1 is a front view of the newspaper, Fig. 2 is a face view of the newspaper with the lower half of the first leaf turned up and the corner of the second leaf turned up, Fig. 3 is a back view of the newspaper with a corner of the last leaf turned up, and Fig. 4 is a face view of the newspaper with the upper portion of the last leaf turned down and the corners of the other leaves turned down.

The newspaper is herein shown as having its leaves secured together along a line 1 transversely through the middle of the printed pages and provided with a fold along said line.

The front page is printed on the front side of one sheet and the back page is printed on the back side of another sheet, the printed matter on the front page and back page both reading in the same direction.

The intermediate pages are printed partly on one sheet and partly on another sheet, the two printed portions on the same side of any sheet being printed in reverse directions so that the newspaper may be read up to the back page by turning over the leaves in one direction and from the back page to the front page by reversing the newspaper on its longitudinal axis and turning the leaves over in the reverse direction.

By providing the newspaper with a fold and by securing the leaves together along the fold transversely of the columns of printed matter midway of the pages, the newspaper is kept within convenient size even when unfolded and access to any page of printed matter is readily obtained without difficulty.

By the term "newspaper" I wish to include all large products of an equivalent nature where the size of the product renders the same open to the disadvantages and defects enumerated if they were printed and folded as heretofore and in which such disadvantages and defects would be remedied by the printing and folding of the same in the manner substantially as herein shown and described.

By the term "page" as used herein, I mean the largest printed surface which can be exposed at one time to the eye of the reader whether printed on one sheet as is each of the front and back pages or printed on two sheets as is each of the remaining pages.

What I claim is:—

1. A newspaper comprising a plurality of assembled leaves secured together along a line extending transversely across the middle of the printed pages, the printed matter being so arranged that the first half of the paper may be read from front to back by turning the leaves over in one direction and the remaining half of the paper may be read from back to front by reversing the paper and turning the leaves over in the opposite direction.

2. A newspaper comprising a plurality of assembled leaves provided with a fold line extending transversely across the middle of the printed pages, the printed matter being so arranged that the first half of the paper may be read from front to back by turning the leaves over in one direction and the remaining half of the paper may be read from back to front by reversing the paper and turning the leaves over in the opposite direction.

3. A newspaper comprising a plurality of assembled leaves provided with a fold line extending transversely across the middle of the printed pages, said leaves being secured together along the fold line, the printed matter being so arranged that the first half of the paper may be read from front to back by turning the leaves over in one direction and the remaining half of the paper may be read from back to front by reversing the paper and turning the leaves over in the opposite direction.

4. A newspaper comprising a plurality of assembled leaves provided with a fold line extending transversely across the middle of the printed pages, the printed matter being so arranged that the first half of the paper may be read from front to back by turning the leaves over in one direction and the remaining half of the paper may be read from back to front by reversing the paper and turning the leaves over in the opposite direction, the front page being printed on the front side of the front leaf, the back page being printed on the back side of the back leaf and the intermediate pages being each printed partly on the back side of one leaf and partly on the front side of another leaf, the portions of two different pages on the same side of any one leaf being printed in opposite directions and the back page being printed in the same direction as the front page.

5. A newspaper comprising a plurality of assembled leaves provided with a fold line extending transversely across the middle of the printed pages, said leaves being secured together along the fold line, the printed matter being so arranged that the first half of the paper may be read from front to back by turning the leaves over in one direction and the remaining half of the paper may be read from back to front by reversing the paper and turning the leaves over in the opposite direction, the front page being printed on the front side of the front leaf, the back page being printed on the back side of the back leaf and the intermediate pages being each printed partly on the back side of one leaf and partly on the front side of another leaf, the portions of two different pages on the same side of any one leaf being printed in opposite directions and the back page being printed in the same direction as the front page.

In testimony, that I claim the foregoing as my invention, I have signed my name in presence of two witnesses, this twenty-seventh day of March, 1913.

EDGAR H. COTTRELL.

Witnesses:
F. GEORGE BARRY,
C. S. SUNDGREN.

Copies of this patent may be obtained for five cents each, by addressing the "Commissioner of Patents, Washington, D. C."